United States Patent [19]

Gallo

[11] 3,805,983
[45] Apr. 23, 1974

[54] WHEEL AND TIRE MOUNT
[76] Inventor: George T. Gallo, 15 Cataldo Dr., Revere, Mass. 02151
[22] Filed: Sept. 13, 1972
[21] Appl. No.: 288,712

[52] U.S. Cl. .............................................. 214/331
[51] Int. Cl. ........................................... B60b 29/00
[58] Field of Search ............ 105/215; 214/330, 331, 214/332, 333, 334

[56] References Cited
UNITED STATES PATENTS
3,482,719   12/1969   Sedgebeer .......................... 214/332
2,551,483   5/1951    Bartoe ............................... 214/332
3,258,146   6/1966    Hamilton ........................... 214/331

Primary Examiner—Robert G. Sheridan
Assistant Examiner—Lawrence Oresky
Attorney, Agent, or Firm—Robert T. Gammons; Dike, Bronstein, Roberts & Cushman

[57] ABSTRACT

A wheel and tire mount comprising a truck supported at its four corners on ball bearings for movement in a horizontal plane, an elevator plate mounted on the truck for angular movement about a vertical axis and vertical movement thereon and spaced parallel rollers mounted on the elevator plate for rotation about their longitudinal axes for supporting the tire of a wheel and tire assembly for mounting the wheel and tire on the hub of a vehicle or removing it therefrom. A fulcrum on the truck and a shoulder on the elevator plate with which a lever is adapted to be engaged provide for raising the elevator plate.

8 Claims, 4 Drawing Figures

WHEEL AND TIRE MOUNT

BACKGROUND OF THE INVENTION

There are a variety of wheel and tire mounting devices as disclosed in the following U.S. Pat., Nos. 2,471,051, 2,539,274, 2,565,869, 2,613,084, 2,812,086 and 2,833,549. Most of these patents provide a structure which enables moving the wheel and tire to a position for mounting or dismounting; however, they are not completely satisfactory from the standpoint of relieving the operator from the frustration and physical efforts required in mounting and dismounting a heavy wheel and tire from a crouching or kneeling position which is awkward in itself. The purpose of this invention is to provide a wheel and tire mount of improved construction embodying some of the structural features of the structures shown in the aforesaid patents combined in an improved and unique manner so as to enable the average person to mount and dismount a wheel and tire assembly with very little physical effort.

SUMMARY

As herein illustrated, the mount comprises spaced parallel rollers adapted to be supported in a horizontal position beside a vehicle adjacent to the hub of the wheel which is to be mounted or dismounted to facilitate such mounting and dismounting, the rollers being spaced for engagement with the wheel at arcuately spaced places and means rigidly supporting the rollers in such spaced parallel relations for rotation about their axes, for angular movement about a vertical axis perpendicular to the plane of their axes at the intersection of diagonals drawn from the ends of said axes, for vertical movement perpendicular to said plane, for horizontal movement toward and from the hub and for horizontal movement tranversely of the hub. The aforesaid truck is mounted on ball bearing members for movement in any direction in a horizontal plane and a post is fixed to the truck in a perpendicular position in which the elevator plate is mounted for angular movement about the axis of the post and for vertical movement thereon. The rollers are mounted on the elevator plate. The elevator plate comprises a rigid rectangular plate provided with bearing members on which the rollers are rotatably supported and there are antifriction bearings on the truck on which the elevator plate rests for angular movement about the axis of the post. A fulcrum on the truck and a shoulder on the elevator plate provide means with which a lever is adapted to be engaged to raise the elevator plate.

The invention will now be described in greater detail with reference to the accompanying drawings wherein.

Figure 1:
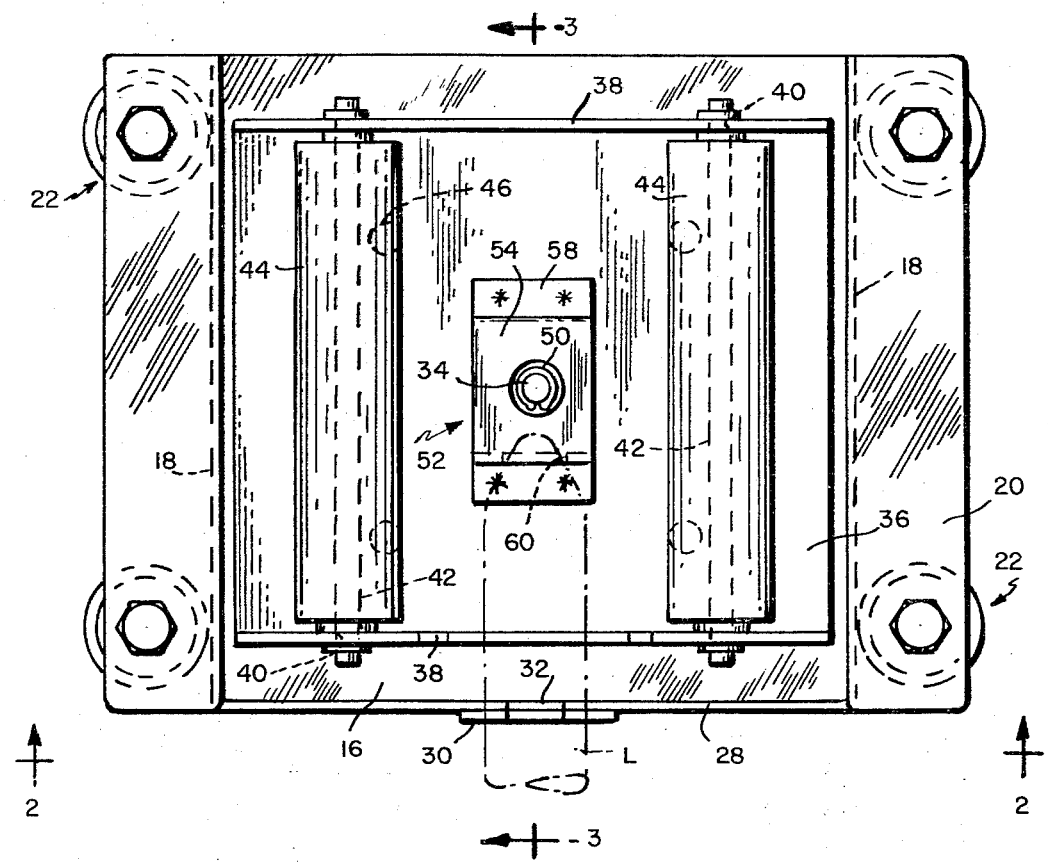
FIG. 1 is a plan view of the wheel and tire mount.

Referring to the drawings, the wheel and tire mount comprise in general a truck 10 adapted to be placed on the ground adjacent the wheel of a vehicle which has been jacked up for movement toward and from the hub of the vehicle and for movement transversely thereof to a position to enable dismounting the wheel from the hub and thereafter replacing the wheel with a repaired or new tire.

Figure 2:
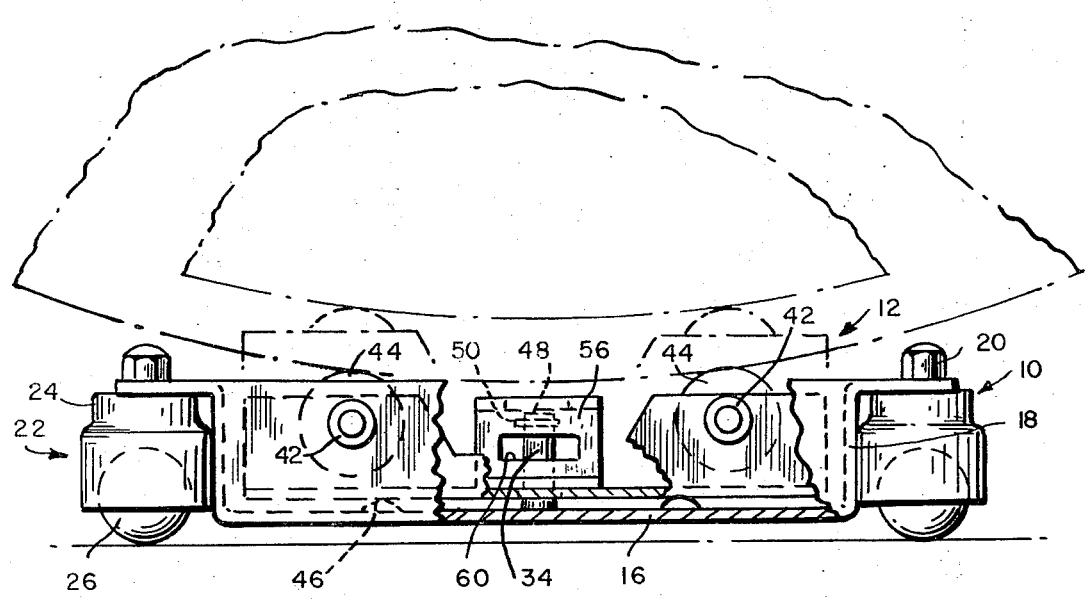
FIG. 2 is an elevation, partly in setion, taken on the line 2—2 of FIG. 1 showing a portion of the tire resting thereon.

The truck comprises, as shown in FIG. 2, a flat, rigid rectangular plate 16, at the opposite ends of which there are integrally formed vertical walls 18-18, at the upper ends of which there are horizontal, outwardly extending flanges 20-20. Ball bearing assemblies 22 comprising ball housings 24 and balls 26 are attached to the undersides of the flanges 20-20 at opposite ends, there being four such assemblies which support the truck in stable equilibrium at the four corners for movement on the ground in a horizontal plane in any direction.

At one edge of the plate 16 (FIG. 1), the side that will be the more remote from the wheel of the vehicle when the truck is placed under the wheel, there is a vertical wall 28 which is connected at its ends to the walls 18-18. At the center of this wall 28 there is a fulcrum plate 30 welded or otherwise fastened thereto, in the upper edge of which there is a notch comprising a fulcrum.

An elevator is mounted on the truck on a vertically disposed post 34 fixed at its lower end to the center of the plate 16 and comprises a flat, rigid rectangular plate 36 which has along two of its opposite sides vertical walls 38-38, these walls extending in a direction at right angles to the walls 18-18 and parallel to the wall 28. The walls 38-38 contain longitudinal spaced openings 40-40 which comprise bearing holes for receiving the opposite ends of shafts 42-42 on which are rotatably mounted cylindrical rollers 44-44. The shafts and rollers are supported symmetrically with respect to the axis of the post so that diagonals drawn through the ends of the shafts 42-42 intersect the axis of the post.

The elevator plate 36 is supported in spaced parallel relation to the plate 16 by antifriction bearing members 46, there being four such bearing members disposed at equal angular distances around the axis of the post. As thus constructed the elevator plate is movable in elevation relative to the truck and is also movable angularly about the vertical axis of the post a limited distance. To prevent the elevator from being disengaged from the upper end of the post the latter contains a groove 48 in which there is mounted a snap ring 50.

Figure 3:
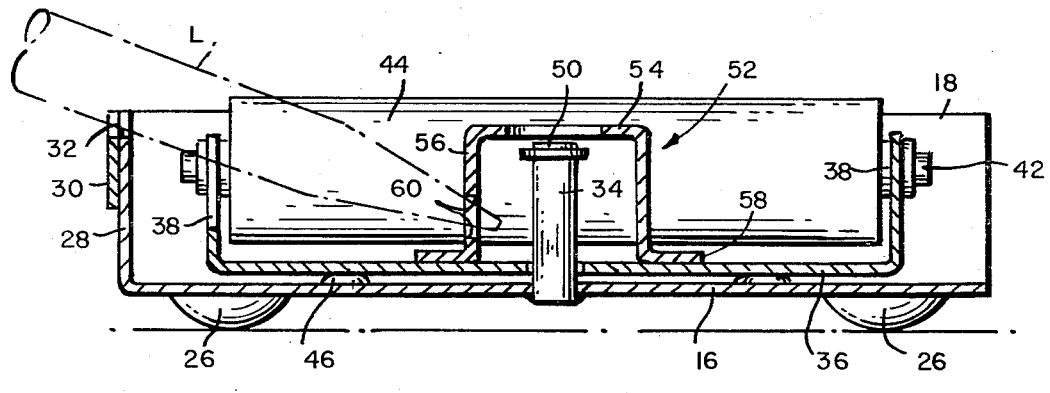
FIG. 3 is a section taken on the line 3—3 of FIG. 1.

A U-shaped bridge piece 52 (FIG. 3) provided with legs 54-54, at the lower ends of which there are flanges 58-58, is fastened over the post at the center of the plate by welding the flanges 58-58 to the plate 36. The leg 54 at the side adjacent to the wall 28 contains near its lower end a hole 60 which is situated in line with the notch 32 in the wall 38 but at a lower level. By placing a lever L across the fulcrum with one end engaged with the hole 60 and depressing the opposite end the elevator may be raised relative to the truck.

In using the mount for dismounting a wheel or tire the truck is moved to a position under the jacked up wheel of the vehicle, the lug nuts on the wheel are removed and the wheel resting on the rollers is disengaged from the hub by pulling the truck away from the hub. In dismounting the wheel the elevator may be raised slightly with respect to the truck after the rollers are engaged with the underside of the tire sufficiently to lift the weight of the wheel off the lugs so that the wheel can be drawn off the hub with substantially no effort and without having to drag it off the threaded lugs. For mounting a wheel and tire assembly on the jacked up hub the wheel is placed on the rollers whereupon the truck is moved toward the vehicle and transversely with respect thereto until the center of the wheel is substantially opposite the hub, the wheel being rotated about a vertical axis if this is necessary to bring the flange of the wheel into parallelism with the hub whereupon the elevator plate is raised to bring the center of the wheel up to the axis of the hub, the wheel is turned one way or the other to bring the holes in the flange in alignment with the lugs on the hub and then the truck is moved inwardly to engage the holes in the flange with the lugs. This may all be done very quickly and easily without having to at any time physically support the wheel. The foregoing is all possible by reason of the fact that the truck can be moved horizontally in any direction, can be turned about a vertical axis, the elevator can be turned about a vertical axis and elevated on the truck and the rollers are free to rotate about their horizontal axes.

Figure 4:
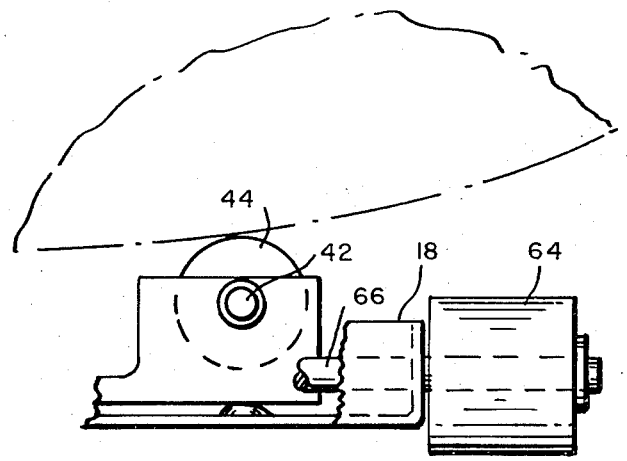
FIG. 4 is a fragmentary elevation of an alternative support for the truck.

Alternatively, a truck may be provided with rollers 64-64 instead of ball bearings and when this structure is used spaced parallel shafts 66-66 (FIG. 4) are mounted in the walls 18-18 with their ends extending outwardly beyond these walls for receiving the roller bearings. When the roller bearings 64-64 are used the mount can be moved forwardly and rearwardly toward the wheel but not laterally and so the device must be placed initially substantially in confronting relation with the axis of the hub. The rotational movement of the elevator and the raising and lowering thereof is the same as described with respect to the preferred form of the invention described above.

The mount as thus constructed is rugged, inexpensive to manufacture and provides for moving and adjusting the wheel and tire mount to a position for mounting or dismounting with the least amount of physical effort and manipulation.

It should be understood that the present disclosure is for the purpose of illustration only and includes all modifications and equivalents which fall within the scope of the appended claims.

I claim:

1. A wheel and tire mount for mounting a wheel and tire assembly on the hub of a vehicle or dismounting it therefrom comprising a first rectangular rigid plate, ball bearing members on the plate on which the plate is adapted to roll, a post fixed to the center of said first plate in a perpendicular position, a second rigid plate containing a hole at its center mounted on said post for angular movement about the axis of the post and vertical movement thereon, and a pair of spaced parallel roller members mounted on the second plate for rotation about their axes.

2. A structure according to claim 1, wherein there are antifriction bearing members on the first rectangular plate situated below the second plate on which the second plate rests for angular movement about the vertical axis of the post.

3. A structure according to claim 1, wherein there is a fulcrum on the first plate and a shoulder on the second plate with which a lever is adapted to be engaged to raise the second plate with respect to the first plate.

4. In a wheel and tire mount, a truck comprising a rigid rectangular plate, ball bearing assemblies containing balls fixed to said plate for movement of the plate in a horizontal plane, a post fixed to the center of said plate in a perpendicular position, an elevator plate mounted on the post for vertical movement relative to said plate, said elevator plate containing a hole at its center positioned over the post, spaced parallel bearing members on the elevator plate at opposite ends thereof, rollers mounted between the bearing members in spaced parallel relation for rotation about their longitudinal axes, said elevator plate being movable angularly about said post, a bridge member fixed to the elevator plate over the post, said bridge member containing a hole providing a shoulder, a fulcrum on said first plate, outwardly of the hole providing a shoulder situated in a position above the level of the hole, and a lever arm adapted to be mounted on the fulcrum with one end engaged with said shoulder and the other end extending upwardly over the fulcrum such that by depressing the upwardly extending end of the lever arm the lower end will raise the elevator plate.

5. A wheel and tire mount for mounting a wheel and tire assembly on the hub of a vehicle or for dismounting it therefrom, comprising spaced parallel rollers, a truck, and means rigidly supporting the rollers in such spaced parallel relation for rotation about their axes, for vertical movement perpendicular to the plane of the axes of the rollers, for angular movement about a vertical axis at the intersection of the diagonals drawn through the ends of said axes, for horizontal movement toward and from the hub of the vehicle, and for horizontal movement transversely of the hub of the vehicle, said means comprising a truck, a post fixed to the truck in a perpendicular position, an elevator mounted on the post for angular movement about its vertical axis and for vertical movement, said spaced parallel rollers being rotatably mounted on the elevator, ball bearing members on the truck on which the elevator rests for movement in a horizontal plane, a fulcrum on the truck and a shoulder on the elevator plate with which a lever is adapted to be engaged to raise the elevator plate relative to the truck.

6. A wheel and tire mount for mounting a wheel and tire assembly on the hub of a vehicle or for dismounting it therefrom, comprising spaced parallel, horizontally disposed rollers, a truck, a post fixed to the truck in a perpendicular position, an elevator plate containing a hole for receiving said post for angular movement about the axis of the post and for vertical movement thereon, means supporting the rollers on the elevator plate symmetrically with respect to the axis of the post with the uppermost surfaces of said rollers always extending above the uppermost end of said post means supporting the truck for horizontal movement on a supporting surface, and anti-friction means supporting the elevator plate on the truck for angular movement about the axis of the post in a horizontal plane.

7. A wheel and tire mount according to claim 6, wherein there is means on the post limiting upward movement of the elevator plate thereon.

8. A wheel and tire mount according to claim 6, comprising means on the truck and elevator plate with which a lever may be engaged to raise the elevator plate relative to the truck.

* * * * *